(12) United States Patent
Lior et al.

(10) Patent No.: US 9,366,191 B2
(45) Date of Patent: Jun. 14, 2016

(54) FLEXIBLE SHIELD FOR FLUID CONNECTORS

(71) Applicants: Raphael Lior, Brookline, MA (US); Robert J. DeRosa, Tolland, CT (US)

(72) Inventors: Raphael Lior, Brookline, MA (US); Robert J. DeRosa, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 453 days.

(21) Appl. No.: 13/630,932

(22) Filed: Sep. 28, 2012

(65) Prior Publication Data
US 2014/0215997 A1 Aug. 7, 2014

(51) Int. Cl.
| F02C 7/25 | (2006.01) |
| F02C 7/24 | (2006.01) |
| F23R 3/60 | (2006.01) |
| F16L 57/00 | (2006.01) |
| F02C 7/22 | (2006.01) |

(52) U.S. Cl.
CPC ... *F02C 7/24* (2013.01); *F02C 7/22* (2013.01); *F02C 7/25* (2013.01); *F16L 57/00* (2013.01); *F23R 3/60* (2013.01); *F05D 2300/21* (2013.01); *F05D 2300/614* (2013.01); *Y02T 50/672* (2013.01); *Y10T 29/49229* (2015.01)

(58) Field of Classification Search
CPC ................. F02C 7/25; F02C 7/22; F23R 3/60
USPC ........... 60/734, 739, 740, 746, 796, 798, 799; 285/45, 114–116
See application file for complete search history.

(56) References Cited

U.S. PATENT DOCUMENTS

| 4,406,431 A | * | 9/1983 | Heuberger | .................. 244/53 B |
| 4,422,675 A | * | 12/1983 | Norris et al. | .................... 285/45 |
| 4,467,610 A | * | 8/1984 | Pearson et al. | .................. 60/739 |
| 4,489,960 A | * | 12/1984 | Senatro | ........................... 285/45 |
| 4,708,371 A | * | 11/1987 | Elsworth et al. | ................ 285/13 |
| 5,279,112 A | | 1/1994 | Halila | |
| 5,611,577 A | * | 3/1997 | Meyer et al. | .................. 285/261 |
| 6,670,291 B1 | | 12/2003 | Tompkins et al. | |
| 7,918,081 B2 | | 4/2011 | Schlichting et al. | |
| 2006/0280940 A1 | * | 12/2006 | Kanka | ........................... 428/364 |

(Continued)

FOREIGN PATENT DOCUMENTS

| CA | 1255239 A1 | 6/1989 |
| DE | 33 35 580 A1 | 4/1985 |

(Continued)

OTHER PUBLICATIONS

International Search Report and Written Opinion for related International Application No. PCT/US13/51341; report dated Jan. 13, 2014.
Supplementary European Search Report for Application No. 13841174 dated Oct. 29, 2015.
English Translation for DE3335580 Abstract.

*Primary Examiner* — Phutthiwat Wongwian
*Assistant Examiner* — Marc Amar
(74) *Attorney, Agent, or Firm* — Cantor Colburn LLP

(57) ABSTRACT

A flexible shield for fluid connectors of a gas turbine engine is disclosed. The flexible shield may comprise a flexible sleeve adapted to surround the fluid connector, and a coupling configured to secure the flexible sleeve onto a fluid tube proximate the fluid connector. A gas turbine engine employing such a flexible shield is also disclosed, as is a method of enclosing a fluid connector in a gas turbine engine using such a flexible shield.

18 Claims, 3 Drawing Sheets

(56) References Cited

U.S. PATENT DOCUMENTS

2008/0141644 A1* 6/2008 Schlichting et al. ......... 60/39.11
2009/0178780 A1* 7/2009 Kammerzell ................... 165/60

FOREIGN PATENT DOCUMENTS

| EP | 209399 A | * | 1/1987 |
| EP | 1 939 428 A2 | | 7/2008 |

* cited by examiner

FLEXIBLE SHIELD FOR FLUID CONNECTORS

FIELD OF THE DISCLOSURE

The present disclosure generally relates to gas turbine engines and, more particularly, relates to fluid connectors within gas turbine engines.

BACKGROUND OF THE DISCLOSURE

A gas turbine engine commonly includes a fan section, a compressor section, a combustor, and a turbine section axially aligned sequentially through the engine. Typically, a fuel system delivers to the engine combustor a uniform flow of clean fuel at the proper pressure and in the necessary quantity to operate the engine. Despite widely varying operational conditions, the fuel supply must be adequate and continuous to meet the demands of the engine.

A typical fuel system for gas turbine engines may comprise a fuel pumping arrangement, a common manifold that extends from the pumping arrangement across the top or side of the engine, and individual fuel lines that extend from the manifold to individual fuel injectors in the combustor. Further, a number of fuel delivery tubes and components that must be connected together by fuel line connections are sometimes disposed near the hot portions of the gas turbine engine.

During operation, the main fuel delivery tube is pressurized and supplies fuel to the other fuel delivery tubes en route to the combustor. Since the fuel is delivered under considerable pressure, all fuel line connectors must be able to withstand continued exposure to such high fuel pressure. Any fuel undesirably exiting through such connectors will degrade engine performance. The release of fuel from such fuel line connectors near hot portions of the engine is particularly important to avoid.

In addition, the lubricant system for gas engines may also include lubricant line connectors which must consistently contain and prevent exit of same for similar reasons. Such fluid connectors in an engine may be provided in any number of different forms such as, but not limited to, ferrules, B-Nuts, and other couplings. Such fluid connectors may be welded or otherwise secured onto fluid transferring tubes, such as, for example, the aforementioned fuel lines or lubricant lines, etc.

The prior art has typically employed metallic spray shields at such connectors to prevent fuel, lubricant, or other fluids unexpectedly exiting from such fluid connectors from contacting hot portions of the engine. These metallic spray shields are typically custom-made and individually installed. Not only are these metallic spray shields expensive, they also require proper installation, special tooling, and considerable time and special skills to make/install. Moreover, the nacelle in current engine designs is substantially reduced in size and thus increases the level of difficulty in properly positioning and attaching such rigid metallic spray shields onto the fluid line systems. This situation is made even more challenging given the tight tolerances under which such systems are manufactured, and the high number of parts used in dense locations around the fluid connectors.

To better answer the challenges raised by the gas turbine industry to produce reliable and high-performance gas turbines engines, it can therefore be seen that improvements in such fluid line connectors are needed.

SUMMARY OF THE DISCLOSURE

In accordance with one aspect of the present disclosure, a flexible shield for a fluid connector of a gas turbine engine is disclosed. The fluid connector may communicate fluid therethrough and connect first and second fluid tubes. The flexible shield may comprise a flexible sleeve surrounding the fluid connector, and a coupling securing the flexible sleeve to at least one of the fluid tubes.

In a refinement, the flexible sleeve may be configured to withstand a temperature of about 1,300° F. (704° C.).

In another refinement, the flexible sleeve may be configured to withstand a pressurized spray of about 1,500 psi.

In another refinement, the coupling may include adhesive tape and a clamp.

In another refinement, the flexible shield may be made of ceramic material.

In another refinement, the flexible sleeve may be made from ceramic oxide fibers.

In still another refinement, the flexible sleeve may include an outer layer and an inner layer.

In accordance with another aspect of the present disclosure, a gas turbine engine is disclosed. The engine may include a compressor section, a combustor downstream of the compressor section, a turbine section downstream of the combustor, at least one fluid line connector associated with the compressor section, combustor and turbine section, and a flexible shield surrounding the fluid connector and including a flexible sleeve and a coupling.

In a refinement, the flexible sleeve of the engine may be configured to withstand a temperature of about 1,300° F. (704° C.).

In another refinement, the flexible sleeve of the engine may be configured to withstand pressurized spray of about 1,500 psi.

In another refinement, the coupling of the engine may include adhesive tape and a clamp.

In another refinement, the flexible sleeve of the engine may be made of ceramic material.

In another refinement, the flexible sleeve of the engine may be made from ceramic oxide fibers.

In still another refinement, the flexible sleeve of the engine may include an outer layer and an inner layer.

In accordance with another aspect of the present disclosure, a method of enclosing a fluid connector in a gas turbine engine using a flexible shield is disclosed. The fluid connector may communicate a fluid therethrough and connect first and second fluid tubes while the flexible shield may include a flexible sleeve and a coupling. The method may comprise sliding the flexible sleeve over the fluid connector such that the flexible sleeve surrounds the fluid connector, positioning the coupling around the flexible sleeve and at least one of the fluid tubes, and attaching the flexible sleeve to the fluid tube using the coupling.

In a refinement, the coupling may include a clamp and attaching the flexible sleeve to the fluid tube may further involve tightening the clamp.

In another refinement, the coupling may further include adhesive tape, and attaching the flexible sleeve to the fluid tube may further involve wrapping the adhesive tape around the flexible sleeve and fluid tube prior to tightening the clamp.

In yet another refinement, the method may further include folding the flexible sleeve into a double-layered structure prior to sliding the flexible sleeve over the fluid connector.

In another refinement, the method may further include configuring the flexible sleeve to withstand temperatures of about 1,300° F. (704° C.) and pressurized sprays of about 1,500 psi.

In still another refinement, the method may further include manufacturing the flexible sleeve from ceramic oxide fibers.

Further forms, embodiments, features, advantages, benefits, and aspects of the present disclosure will become more readily apparent from the following drawings and descriptions provided herein.

Before proceeding with the detailed description, it is to be appreciated that the following detailed description is merely exemplary in nature and is not intended to limit the invention or the application and uses thereof. In this regard, it is to be additionally appreciated that the described embodiment is not limited to use in conjunction with a particular type of flexible shield or gas turbine. Hence, although the present disclosure is, for convenience of explanation, depicted and described as shown in certain illustrative embodiments, it will be appreciated that it can be implemented in various other types of embodiments and equivalents, and in various other systems and environments.

DETAILED DESCRIPTION OF THE DISCLOSURE

Figure 1:
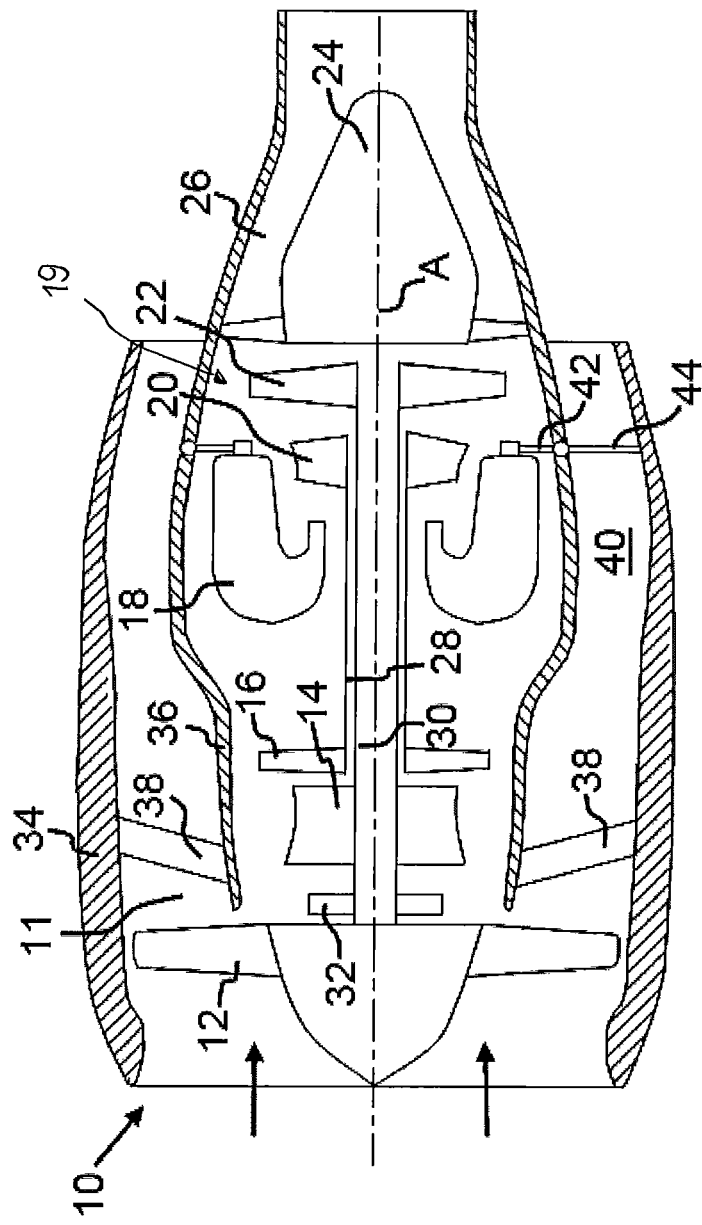
FIG. 1 is a cross-sectional view of an exemplary gas turbine engine according to the present disclosure.

Referring now to the drawings, and with specific reference to FIG. 1, there is depicted an exemplary gas turbine engine 10 according to the present disclosure. In this example, the gas turbine engine 10 may include a compressor section 11 which may comprise, sequentially from the forefront of the gas turbine engine 10, a fan 12, a low pressure compressor 14, and a high pressure compressor 16; a combustor 18 downstream of the compressor section 11; a turbine section 19 including a high pressure turbine 20 and a low pressure turbine 22 both downstream of the combustor 18; a tail cone 24; and an exhaust nozzle 26. Further, a high pressure shaft 28 may couple the high pressure compressor 16 with the high pressure turbine 20, while a low pressure shaft 30 may couple the low pressure compressor 14 with the low pressure turbine 22. Both shafts 28 and 30 may be rotatable about an axis A. The low pressure shaft 30 may drive the fan 12 through a gear train 32. A fan nacelle 34 may surround both the fan 12 and a core nacelle 36, and may support the core nacelle 36 through pylon structures 38 commonly referred to as upper and lower bifurcations. The core nacelle may house the compressors 14 and 16, the combustor 18, the turbines 20 and 22, and the tail cone 24.

In the example shown in FIG. 1, the engine 10 may be a high bypass turbofan arrangement. During operation, part of the air suctioned by the fan 12 may bypass the core nacelle 36 and enter a generally annular bypass flow path 40, which is arranged between the confines of the fan nacelle 34 and core nacelle 36. The rest of air may be directed into the core nacelle 36, pressurized in the compressors 14 and 16, and then mixed with fuel and ignited in the combustor 18 to generate hot gases. The fuel is supplied by a fuel manifold 42 and a fuel supply/drain system 44. The hot gases may expand in and flow through the turbines 20 and 22, which extract energy from the hot gases. The turbines 20 and 22 may then power the compressors 14 and 16 as well as the fan 12 through rotor shafts 28 and 30. Finally, the exhaust gases may exit the gas turbine engine 10 through the exhaust nozzle 26. In power generation applications, the turbines 20 and 22 may connect to an electric generator to generate electricity; while in aerospace applications, the exhaust of the turbine 10 can be used to create thrust. Both the fuel manifold 42 and the fuel supply/drain system 44 may include fluid connectors in the vicinity of hot engine components, such as, for example, a hot combustor.

The gas turbine engine 10 may also have various components, such as gears and bearings, which benefit from lubrication and cooling. A lubricant supply system (not shown) provides oil, or other lubricating fluid, to such components to provide such lubrication and cooling. The lubricant supply system also commonly includes lubricant line connectors which must be maintained to prevent lubricant from contacting hot portions of the engine 10. In sum, there may be many fluid connectors in the gas turbine engine 10, all of which need to be maintained in fluid tight manner, and some of which may be in the vicinity of hot engine components.

Figure 2:
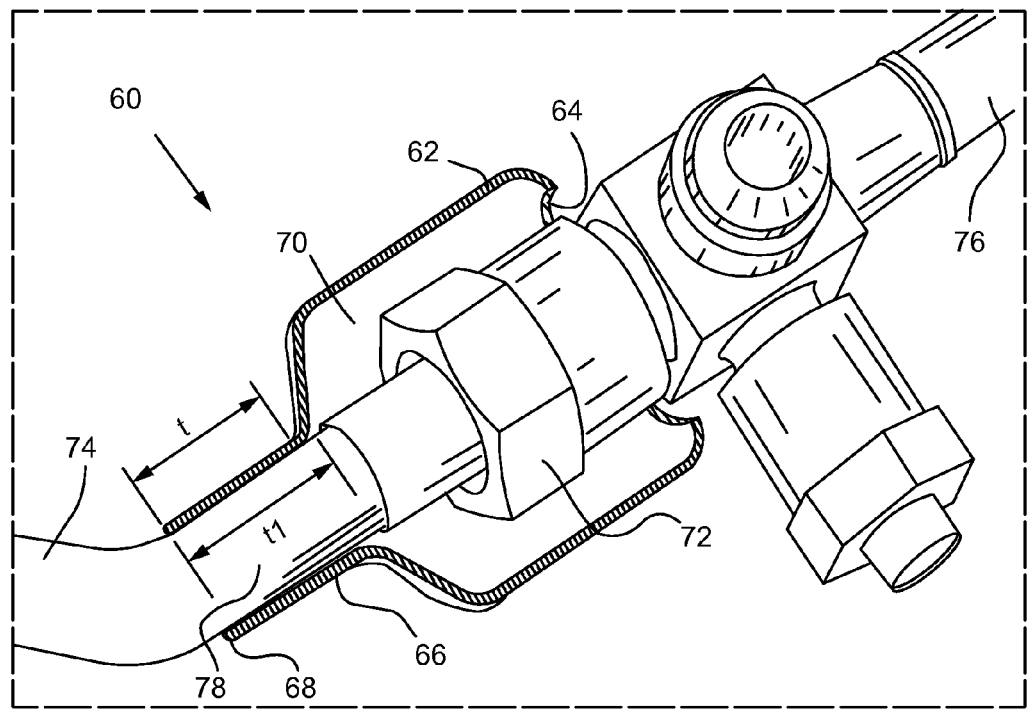
FIG. 2 is a partial, isometric view of a prior art metal spray shield, with a portion of the metal spray shield cut away for clarity.

Turning now to FIG. 2, a typical prior art spray shield 60 for a gas turbine engine is shown. As will be noted, the shield 60 is both rigid and metallic. The conventional spray shield 60 comprises a tubular main body portion 62 which terminates with a first open end 64 on one side, and a reduced-diameter neck portion 66 which terminates in a second open-end 68 on the other side. The neck portion 66 has a length t. The main body 62 defines a cavity 70, within which a fluid connector 72 is enclosed. The fluid connector 72 connects a first fluid tube 74 and a second fluid tube 76. Such fluid tubes 74, 76 may lead to various components of the engine 10 such as, for example, a fuel source and fuel injector or the like. Alternatively, or in addition to fuel, there may be lubricant, or the other fluids, flowing through the fluid connector 72 and the fluid tubes 74 and 76.

As can also be seen from FIG. 2, the fluid tube 74 has a straight portion 78, which enters the cavity 70 through the neck portion 66 before connecting with the fluid connection 72. The straight portion 78 has a length t1. This is of importance in that it illustrates the geometry of the spray shield 60 has to meet several criteria. First, the cavity 70 must be large enough to enclose the fluid connector 72 in its entirety. Second, the length t of the neck portion 66 has to be no longer than the length t1 of the straight portion 78. Otherwise, the neck portion 66 would not accommodate the straight portion 78, and thus may not provide the desired shielding protection. Third, the spray shield 60 must be oriented to guide any fluid unexpectedly exiting from the fluid connector 72 away from hot portions of the engine 10. As these portions vary from engine to engine and location with the engine to location with the engine, it can accordingly be seen that for each fluid connector 72, the manufacturer of such prior art shields 60 has to design a custom-made spray shield tailored to the given engine geometry. This activity incurs considerable labor and material cost, and adds to lead time in manufacturing such engines.

Figure 3:
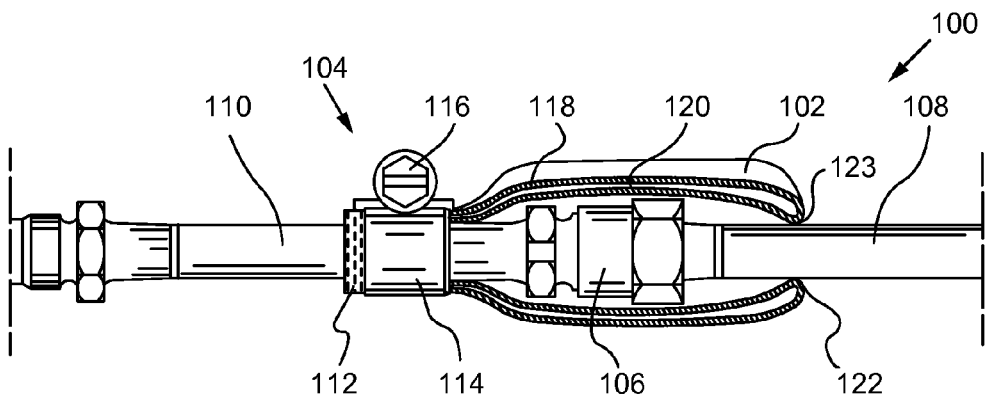
FIG. 3 is a side, partially cut-away, view of a flexible shield according to the present disclosure.

Given the drawbacks of such a conventional approach, the inventors have conceived of the present disclosure, one embodiment of which is shown in FIG. 3. As illustrated in FIG. 3, a flexible shield 100 of the present disclosure is uniquely designed to alleviate the afore-mentioned issues caused by the geometric requirements of such conventional shields and offer significant advantages over the prior art products in both flexibility, and reduced cost and weight. More specifically, the flexible shield 100 may include a flexible sleeve 102, and a coupling 104 to attach and secure the flexible sleeve 102 around a fluid connector 106. As shown, the fluid connector 106 may connect a first fluid tube 108 to a second fluid tube 110. As with the prior art, there may be a fluid such as fuel, lubricant or the like, flowing through the fluid connector 106 and the fluid tubes 108 and 110 between various components of the engine 10, such as but not limited to a fuel source and a fuel injector.

As also shown in FIG. 3, the coupling 104 may include multiple components. For example, the coupling 104 may include a flexible strip material 112, such as adhesive tape or the like, surrounded by a clamp 114, such as, for example, a hose clamp with a captive screw 116. The tape 112 may provide a substantially fluid tight seal between the fluid connector 106 and the fluid line 110. The clamp 114 can then be tightened to secure the two components together. In addition, the sleeve 102 may be a double-layered flexible sleeve with an outer layer 118 and an inner layer 120 connected at a fold 122 defining an opening 123. The opening 123 may allow for passage of the sleeve 102 over the fluid connector 106 and is provided at an end of the sleeve 102 opposite the coupling 104.

Figure 4:
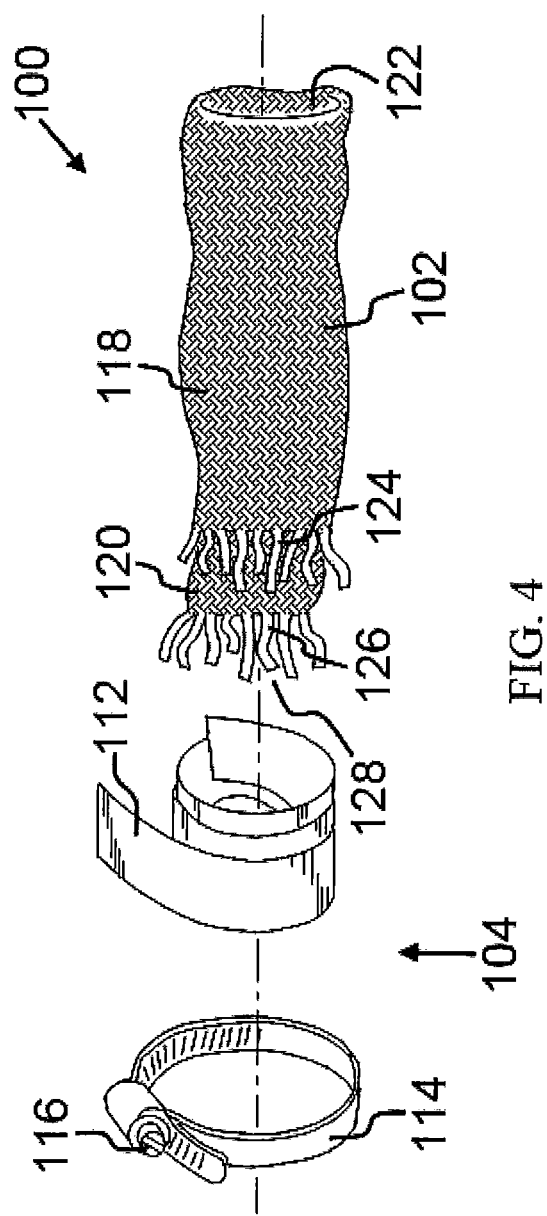
FIG. 4 is an exploded, perspective view of the flexible shield in FIG. 3 according to the present disclosure.

Turning now to FIG. 4, an exploded view of the flexible shield 100 shown in FIG. 3 illustrates both the components thereof and the steps of how to assemble the flexible shield of the present disclosure. As described above, the flexible shield 100 may comprise the flexible sleeve 102 and the coupling 104. To form the shield 100, the flexible sleeve 102 may be cut from a longer roll of stock material to a predetermined length suitable for the given installation. In so doing, the sleeve 102 may have a first frayed end 124 associated with the outer layer 118, and a second frayed end 126 associated with the inner layer 120. A suitable length for the sleeve 102 can be determined by a person skilled in the art after considering various parameters such as, but limited to, the size of the fluid connector 106, the pressure under which the fluid therein is communicated, and the location of the connector 106 relative to the other components of the engine 100.

Once the sleeve 102 is cut, sleeve 102 may be inverted or folded such that the first frayed end 124 of the outer layer 118 is positioned over the second frayed end 126 of the inner layer 120. In so doing, a double-layered structure is formed with the fold 122 (which may be the approximate middle point of the cut sleeve) at one end of the sleeve 102 and a frayed opening 128 at the other end. The frayed opening 128 may include the aforementioned first frayed end 124 and second frayed end 126. After the double-layer structure is formed, the sleeve 102 may be slid over the fluid connection 106 to be protected and positioned so as to fully enclose the fluid connector 106. Further, the sleeve 102 may partially enclose the fluid tube 110 which is connected with the fluid connection 106. The frayed opening 128 may then be connected and substantially sealed to the fluid tube 110 with the coupling 104. More specifically, the adhesive tape 112 may then be wrapped around the sleeve 102 and the fluid tube 110, and once so secured, the clamp 114 may be positioned around the tape 112 and tightened using the screw 116. Once installed, the flexible shield 100 ensures that any fluid exiting the fluid connector 106 is contained and does not contact undesired portions, such as hot portions, of the engine 10.

In one embodiment, the flexible sleeve 102 may withstand temperatures of, for example, about 1,300° F. (704° C.) or about 1,500° F. (816° C.); and pressurized sprays of, for example, about 1,500 psi. In addition, the flexible sleeve 102 may be made from ceramic fibers such as, for example, continuous filament ceramic oxide fibers that can be readily converted into ceramic textile products. The flexible sleeve 102 may meet demanding performance requirements in high-temperature operating environments. Furthermore, the fibers may have low elongation and shrinkage at high operating temperatures, and offer good chemical resistance, low thermal conductivity, thermal shock resistance, low porosity, and unique electrical properties as well.

One commercial version of such ceramic oxide fibers is 3M®Nextel™ Continuous Ceramic Oxide Fibers 312, but other similar materials constructed using refractory fiber technology are available. Such fibers contain about 62% of $Al_2O_3$, about 24% of $SiO_2$, and about 14% $B_2O_3$, existing in the crystal type of 9 $Al_2O_3 \cdot 2B_2O_3$ in addition to amorphous $SiO_2$. Because $B_2O_3$ is present, this fiber composition has both crystalline and glassy phases, the latter of which helps the fiber retain strength after exposure to high temperatures because the glassy phase slows the growth of crystalline phases which weaken the fiber. The fibers and fabrics made thereof are compatible with silicone, epoxy, phenolic, and polyimide materials. Therefore, a coating of suitable polymers on the outward layer 118 of the flexible sleeve 102 is possible. Furthermore, fire barriers constructed using the fibers (density about 2.70 g/cc) are lighter weight than some metallic materials. In one embodiment, the ceramic fiber sleeve of the present disclosure is made from a ceramic oxide fiber sock, for example, a 3M® Nextel™ Continuous Ceramic Oxide Fibers 312 sock.

Other flexible sleeves which may withstand high temperatures of, for example, about 1,300° F. (704° C.) or about 1,500° F. (816° C.), and prevent a pressurized spray of, for example, about 1,500 psi impinging a hot engine case may be used as part of the flexible sleeve 102. A preliminary test using the fiber materials in a simulation test at the above-mentioned temperature and pressure ranges may be used to select the appropriate materials. Even though a double-layer structure is used when constructing the flexible sleeve 102 of the depicted embodiment, other structures including single layer or multiple layers beyond two are possible. In addition, even though the fold 122 depicted is not frayed, one or more frayed ends may initially be provided and weaved together at fold 122. Alternatively, or additionally, coatings, adhesives or heat treatments may be used so that frayed ends will not dissemble or fray further during the operation of the engine 10.

Turning to the adhesive tape 112, any adhesive tape which can withstand temperatures of, for example, about 1,300° F. (704° C.) or about 1,500° F. (816° C.) may be used. For instance, the adhesive white tape used for MED KITS™ may be suitable. Other adhesives, such as, for example, epoxy-based adhesive tapes, may be possible. When applying the adhesive tape 112 over the frayed opening 128, the tape may be rolled over the opening 128 multiple times in such a way that both frayed ends 124 and 126 are fully covered and substantially sealed by the tape 112 so that in operation, the two frayed ends 124 and 126 are not easily dissembled or frayed further.

Referring now to the clamp 114, any clamp which can withstand temperatures of, for example, about 1,300° F. (704° C.) or about 1,500° F. (816° C.) may be used. Conventional clamps used for gas turbine engines are typically made of suitable metals such as aluminum, stainless steel, or Inconel which are selected for use in the engine depending upon the temperature of the individual installation location. For example, such locations may be relatively cool near the fan of the engine, or relatively hot near the combustor and turbines. The clamp 114 may be made of metals, alloys, composites, polymers, other suitable materials, or combinations thereof. The clamp used in the present disclosure may be, but is not limited to, a hose clamp, an alligator P-clamp, a P-clamp with a rubber coating, or other suitable clamps to hold the flexible sleeve 102 onto the fluid tube 110.

Even though both the adhesive tape 112 and the clamp 114 are used as the coupling 104 in FIGS. 3-4, the coupling 104 may include the adhesive tape 112 only, or the clamp 114 only. Moreover, the coupling 104 may comprise additional components such as, for example, a wire, a harness, or the like.

Although not depicted, it is to be understood that the shape of the flexible shield 100 and its components may be curved or contoured to fit the geometries of the fluid connection 106 and the fluid tube 110. This is a significant departure from prior art shields which were manufactured from rigid materials, typically metal, and thus were not malleable, or easily adjustable so as to be used in multiple locations throughout the engine. Furthermore, even though FIGS. 3-4 depict the flexible shield 100 and its components as having certain relative dimensions, such dimensions are only exemplary and other relative dimensions are possible. In addition, although FIGS. 3-4 show the application of the flexible shield 100 to protect fuel line connectors, the flexible shield 100 may protect any other fluid connectors of a gas turbine engine as well, including but not limited to, lubricant lines and the like.

INDUSTRIAL APPLICABILITY

From the foregoing, it can be seen that the present disclosure describes a flexible shield for fluid connectors. Such flexible shields may find industrial applicability in many applications including, but not limited to, aerospace applications such as gas turbine engines employed on aircraft for providing thrust or auxiliary power.

By employing a flexible sleeve and securing same with a coupling able to withstand high temperatures, the present disclosure provides an adaptable and reliable shield which is able to prevent passage of fluids undesirably exiting from a fluid connector to other parts of the engine. Since the flexible sleeve may be easily cut to the desired length, and then be folded into the desired shape over the fluid connection, the present disclosure provides a novel and inexpensive alternative to construct shields for fluid connectors within gas turbine engines. Furthermore, since the shield is flexible, it can be secured to both straight and curvilinear fluid tubes without doing significant structural modification of the shield. This is in contrast to the conventional metallic spray shield designs which are rigid and which require different shields for each of the afore-mentioned scenarios. Moreover, using the novel shield according to the present disclosure to build gas turbine engines opens up new possibilities for gas turbine engines which may reduce costs associated with time-consuming, expensive, and custom-built metallic spray shields.

While the invention has been described with reference to certain embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A flexible shield for fluid connectors of a gas turbine engine, the fluid connector communicating fluid therethrough and connecting first and second fluid tubes, the flexible shield comprising:
    a flexible sleeve surrounding the fluid connector and having a first and second end, the first and second end each being tubular, the flexible sleeve being a fabric sleeve that is folded into a double-layered structure; and a coupling securing the first and second end of the flexible sleeve to at least one of the fluid tubes.

2. The flexible shield of claim 1, wherein the flexible sleeve is configured to withstand a temperature of about 1,300° F. (704° C.).

3. The flexible shield of claim 1, wherein the flexible sleeve is configured to withstand a pressurized spray of about 1,500 psi.

4. The flexible shield of claim 1, wherein the coupling includes adhesive tape and a clamp.

5. The flexible shield of claim 1, wherein the flexible sleeve is made of ceramic material.

6. The flexible shield of claim 5, wherein the flexible sleeve is made from ceramic oxide fibers.

7. The flexible shield of claim 1, wherein the double-layered structure includes an outer layer, and inner layer, a first frayed end associated with the outer layer, and a second frayed end associated with the inner layer.

8. A gas turbine engine, comprising:
    a compressor section;
    a combustor downstream of the compressor section;
    a turbine section downstream of the combustor;
    at least one fluid line connector associated with the compressor section, combustor, and turbine section, the connector communicating fluid therethrough and connecting first and second fluid tubes; and
    a flexible shield surrounding the fluid connector and including a flexible sleeve having a first and second end, the first and second end each being tubular, and a coupling, the flexible sleeve being a fabric sleeve that is folded into a double-layered structure, the coupling securing the first and second end of the flexible sleeve to at least one of the fluid tubes.

9. The gas turbine engine of claim 8, wherein the flexible sleeve is configured to withstand a temperature of about 1,300° F. (704° C.).

10. The gas turbine engine of claim 8, wherein the flexible sleeve is configured to withstand a pressurized spray of about 1,500 psi.

11. The gas turbine engine of claim 8, wherein the coupling includes adhesive tape and a clamp.

12. The gas turbine engine of claim 8, wherein the flexible sleeve is made of ceramic material.

13. The gas turbine engine of claim 12, wherein the flexible sleeve is made from ceramic oxide fibers.

14. A method of enclosing a fluid connector in a gas turbine engine using a flexible shield, the fluid connector communicating a fluid therethrough and connecting first and second fluid tubes, the flexible shield including a flexible sleeve having a first and second end, the first and second end each being tubular, and a coupling, the method comprising:
    manually folding a fabric sleeve into a double-layered structure to provide the flexible sleeve;
    sliding the flexible sleeve over the fluid connector such that the flexible sleeve surrounds the fluid connector;
    positioning the coupling around the flexible sleeve and at least one of the fluid tubes; and attaching the flexible sleeve to the fluid tube using the coupling, the coupling securing the first and second end of the flexible sleeve to at least one of the fluid tubes.

15. The method of claim 14, wherein the coupling includes a clamp and attaching the flexible sleeve to the fluid tube further involves tightening the clamp.

16. The method of claim 15, wherein the coupling further includes adhesive tape, and attaching the flexible sleeve to the fluid tube further involves wrapping the adhesive tape around the flexible sleeve and fluid tube prior to tightening the clamp.

17. The method of claim 14, further including configuring the flexible sleeve to withstand temperatures of about 1,300° F. (704° C.), and pressurized sprays of about 1,500 psi.

18. The method of claim 15, further including manufacturing the flexible sleeve from ceramic oxide fibers.

* * * * *